(12) United States Patent
Deng et al.

(10) Patent No.: US 9,786,026 B2
(45) Date of Patent: Oct. 10, 2017

(54) ASYNCHRONOUS TRANSLATION OF COMPUTER PROGRAM RESOURCES IN GRAPHICS PROCESSING UNIT EMULATION

(71) Applicant: Microsoft Technology Licensing, LLC, Redmond, WA (US)

(72) Inventors: Ke Deng, Sammamish, WA (US); Eric Heutchy, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/739,988

(22) Filed: Jun. 15, 2015

(65) Prior Publication Data

US 2016/0364830 A1 Dec. 15, 2016

(51) Int. Cl.
*G06F 9/44* (2006.01)
*G06T 1/20* (2006.01)
*G06T 15/00* (2011.01)
*G06F 9/45* (2006.01)
*G06F 9/455* (2006.01)

(52) U.S. Cl.
CPC ............. *G06T 1/20* (2013.01); *G06F 8/41* (2013.01); *G06F 8/53* (2013.01); *G06F 9/44* (2013.01); *G06F 9/4552* (2013.01); *G06F 9/45504* (2013.01); *G06T 15/005* (2013.01)

(58) Field of Classification Search
CPC ........... G06F 8/41; G06F 8/65; G06F 9/45504
USPC .......................................... 717/138, 140, 172
See application file for complete search history.

(56) References Cited

U.S. PATENT DOCUMENTS

| 6,115,054 A * | 9/2000 | Giles ..................... G06T 1/20 345/522 |
| 6,731,288 B2 | 5/2004 | Parsons et al. |
| 6,937,246 B2 | 8/2005 | Munshi et al. |
| 6,947,049 B2 | 9/2005 | Spitzer et al. |
| 6,975,325 B2 | 12/2005 | Morein et al. |
| 7,015,909 B1 * | 3/2006 | Morgan, III .......... G06T 15/005 345/426 |

(Continued)

OTHER PUBLICATIONS

"Ios—Can you Prewarm a Shader on a Background Thread with its Own Context?", Retrieved on: Apr. 20, 2015, Available at: http://stackoverflow.com/questions/8797361/can-you-prewarm-a-shader-on-a-background-thread-with-its-own-context.

(Continued)

*Primary Examiner* — Phillip H Nguyen

(57) ABSTRACT

Resource processing during run time can be performed asynchronously from emulation of an application by a central processing unit. For example, an emulator can include a main processing thread that performs emulation processes. In response to encountering a shader, or other resource, to be processed, the emulator can invoke a separate asynchronous thread to perform such processing. Processed resources, such as translated shaders and generated textures, can be stored in a cache. In response to a command that uses a resource, such as a draw command that invokes a shader or other resource, the emulator can use the processed resource in the cache. If the processed resource is not in the cache, the emulator can skip processing the command that uses the resource. If processed resources can be obtained from other sources and loaded in the cache, processing of resources by the emulator can be eliminated.

20 Claims, 9 Drawing Sheets

(56) References Cited

U.S. PATENT DOCUMENTS

| | | | |
|---|---|---|---|
| 7,174,436 B1 | 2/2007 | Langendorf et al. | |
| 7,219,085 B2 | 5/2007 | Buck et al. | |
| 7,245,302 B1 | 7/2007 | Donham et al. | |
| 7,385,608 B1 | 6/2008 | Baldwin | |
| 7,439,979 B1* | 10/2008 | Allen | G06T 1/20 |
| | | | 345/506 |
| 7,447,997 B2 | 11/2008 | Colle | |
| 7,466,314 B2 | 12/2008 | Loop et al. | |
| 7,623,132 B1 | 11/2009 | Bastos et al. | |
| 7,652,666 B2 | 1/2010 | Pellacini et al. | |
| 7,676,448 B2* | 3/2010 | Henderson | G06F 8/65 |
| | | | 709/203 |
| 7,750,913 B1* | 7/2010 | Parenteau | G06F 8/30 |
| | | | 345/426 |
| 7,817,151 B2 | 10/2010 | Zhang | |
| 7,817,154 B1 | 10/2010 | Sams et al. | |
| 8,001,531 B1 | 8/2011 | Rideout et al. | |
| 8,006,232 B1 | 8/2011 | Rideout et al. | |
| 8,081,184 B1 | 12/2011 | Nordquist | |
| 8,174,534 B2 | 5/2012 | Jiao | |
| 8,289,325 B2 | 10/2012 | Green et al. | |
| 8,365,153 B2 | 1/2013 | Chen et al. | |
| 8,482,561 B2 | 7/2013 | McCombe et al. | |
| 8,643,659 B1 | 2/2014 | Baldwin | |
| 8,711,159 B2 | 4/2014 | Li et al. | |
| 8,854,368 B1 | 10/2014 | Russel | |
| 2002/0190989 A1* | 12/2002 | Kamata | G06T 15/40 |
| | | | 345/440 |
| 2003/0009748 A1* | 1/2003 | Glanville | G06T 1/20 |
| | | | 717/140 |
| 2003/0076722 A1 | 4/2003 | Solomon | |
| 2004/0012596 A1 | 1/2004 | Allen et al. | |
| 2004/0207622 A1 | 10/2004 | Deering et al. | |
| 2005/0140672 A1 | 6/2005 | Hubbell | |
| 2005/0162437 A1* | 7/2005 | Morein | G06T 15/80 |
| | | | 345/557 |
| 2005/0235287 A1 | 10/2005 | Harper | |
| 2006/0039468 A1 | 2/2006 | Emerson et al. | |
| 2006/0098017 A1 | 5/2006 | Tarditi et al. | |
| 2006/0098018 A1 | 5/2006 | Tarditi et al. | |
| 2006/0098019 A1 | 5/2006 | Tarditi et al. | |
| 2006/0170680 A1 | 8/2006 | Peeper et al. | |
| 2007/0006178 A1 | 1/2007 | Tan | |
| 2007/0091104 A1 | 4/2007 | Singh et al. | |
| 2007/0103476 A1* | 5/2007 | Huang | G06T 15/005 |
| | | | 345/522 |
| 2007/0260446 A1 | 11/2007 | Suba et al. | |
| 2007/0283158 A1 | 12/2007 | Danseglio | |
| 2008/0024490 A1 | 1/2008 | Loop et al. | |
| 2008/0052701 A1* | 2/2008 | Abernethy | G06F 8/67 |
| | | | 717/170 |
| 2008/0074430 A1* | 3/2008 | Jiao | G06T 15/005 |
| | | | 345/506 |
| 2008/0140380 A1 | 6/2008 | Marsyla et al. | |
| 2008/0204473 A1 | 8/2008 | Jackson | |
| 2008/0218527 A1 | 9/2008 | Romanick | |
| 2009/0051687 A1 | 2/2009 | Kato et al. | |
| 2009/0109219 A1 | 4/2009 | DeCoro et al. | |
| 2009/0110295 A1 | 4/2009 | Ogaki et al. | |
| 2009/0113402 A1* | 4/2009 | Chen | G06F 8/41 |
| | | | 717/140 |
| 2009/0164205 A1 | 6/2009 | Sargaison | |
| 2009/0251476 A1 | 10/2009 | Jiao et al. | |
| 2010/0013842 A1 | 1/2010 | Green et al. | |
| 2010/0082813 A1* | 4/2010 | Li | H04L 67/16 |
| | | | 709/226 |
| 2010/0110083 A1 | 5/2010 | Paltashev et al. | |
| 2010/0214301 A1* | 8/2010 | Li | G06T 1/20 |
| | | | 345/522 |
| 2011/0084976 A1 | 4/2011 | Duluk et al. | |
| 2011/0173476 A1 | 7/2011 | Reed | |
| 2012/0306877 A1 | 12/2012 | Rosasco | |
| 2013/0145202 A1 | 6/2013 | Hartog et al. | |
| 2013/0238938 A1 | 9/2013 | Baliga et al. | |
| 2014/0043333 A1 | 2/2014 | Narayanan et al. | |
| 2014/0063029 A1 | 3/2014 | Oneppo et al. | |
| 2014/0092092 A1 | 4/2014 | Li et al. | |
| 2014/0258997 A1 | 9/2014 | Lim et al. | |
| 2014/0292783 A1* | 10/2014 | Iwagaki | G06T 1/00 |
| | | | 345/522 |
| 2014/0362100 A1 | 12/2014 | Cerny et al. | |
| 2015/0022541 A1 | 1/2015 | Zelsnack | |
| 2015/0091931 A1 | 4/2015 | Pelton et al. | |

OTHER PUBLICATIONS

"Benefits of the Windows Display Driver Model (WDDM)", Published on: Dec. 10, 2012, Available at: https://msdn.microsoft.com/en-us/ibrary/windows/hardware/ff538245(v=vs.85).aspx.

Antonov, Michael, "Asynchronous Timewarp Examined", Published on: Mar. 3, 2015, Available at: https://www.oculus.com/blog/asynchronous-timewarp/.

First Office Action in U.S. Appl. No. 14/740,132, mailed May 7, 2016.

"Hash Function", Retrieved from: <<http://en.wikipedia.org/wiki/Hash_function>>, Retrieved on: Dec. 3, 2007, 5 Pages.

"Shader Development", Retrieved from: <<https://docs.unrealengine.com/latest/INT/Programming/Rendering/ShaderDevelopment/index.html>>, Aug. 26, 2014, 4 Pages.

"Final Office Action Issued in U.S. Appl. No. 12/361,216", dated Feb. 13, 2012, 27 Pages.

"Final Office Action Issued in U.S. Appl. No. 12/361,216", dated Mar. 7, 2013, 30 Pages.

"Final Office Action Issued in U.S. Appl. No. 12/361,216", dated Oct. 9, 2013, 36 Pages.

"Non Final Office Action Issued in U.S. Appl. No. 12/361,216", dated Jul. 3, 2013, 32 Pages.

"Non Final Office Action Issued in U.S. Appl. No. 12/361,216", dated Jul. 27, 2012, 29 Pages.

"Non Final Office Action Issued in U.S. Appl. No. 12/361,216", dated Oct. 18, 2011, 24 Pages.

"Final Office Action Issued in U.S. Appl. No. 12/391,066", dated Nov. 30, 2012, 30 Pages.

"Non Final Office Action Issued in U.S. Appl. No. 12/391,066", dated Jul. 8, 2013, 11 Pages.

"Non Final Office Action Issued in U.S. Appl. No. 12/391,066", dated Jun. 19, 2012, 25 Pages.

"Notice of Allowance Issued in U.S. Appl. No. 12/391,066", dated Dec. 16, 2013, 7 Pages.

"Final Office Action Issued in U.S. Appl. No. 14/740,132", dated Nov. 14, 2016, 28 Pages.

Botelho, et al., "Perfect Hashing for Data Management Applications", In arXiv preprint cs/0702159, Feb. 27, 2007, 12 Pages.

"Office Action Issued in U.S. Appl. No. 14/740,132", dated May 3, 2017, 23 Pages.

* cited by examiner

ASYNCHRONOUS TRANSLATION OF COMPUTER PROGRAM RESOURCES IN GRAPHICS PROCESSING UNIT EMULATION

BACKGROUND

Some computers include a graphics processing unit (GPU) which is a co-processor of a central processing unit. A graphics processing unit has a parallel processing architecture specifically designed to efficiently process graphics rendering operations, but also is applicable to similar kinds of operations that can be readily executed in parallel.

When a software developer creates an application for use on a computer with a GPU, an executable computer program is created. This executable computer program is generated for use on a particular type of computer with a combination of elements, typically called a platform, which includes the type of central processing unit, the type of graphics processing unit and the type of operating system. This executable program includes computer program code that can be executed by the GPU of that platform. Such an executable computer program would not run on another platform that is otherwise the same as the original platform, but has a different GPU, unless that different GPU had the same interfaces and instruction set as the GPU in the original platform.

Often, to address such a problem, the software developer may port an application to generate versions of the application that run on different platforms. However, porting does not assist end users who have a version of the application for one platform and who would like to use that version on another platform. For example, a game produced for one game console would not be executable on another game console unless that other game console incorporated the platform of the original game console in some way.

One way to incorporate the platform of a first computer in a second computer is to provide computer software on the second computer that emulates the platform of the first computer. When an application is executed on the second computer, if the application is determined to be an executable for the first computer, the second computer runs an emulator on its central processing unit which configures the second computer to provide interfaces to interact with the application in the same manner of the first computer, and translate commands and data between the application and the operating system, central processing unit and graphics processing unit of the second computer.

One challenge with emulating applications that use a graphics processing unit is the inclusion in such applications of small programs, called shaders, which are executed by the graphics processing unit. These shaders are executable code for an original GPU of the first computer, and need to be translated to be processed by a target GPU in the second computer. Generally, translating a shader is dependent upon a context in which the shader is called during execution of the application. Thus, shaders generally cannot be identified and translated statically prior to execution of the application. Other resources, e.g., graphics resources such as large textures, may have similar characteristics and are identified and processed during execution. Thus, such processing of resources is performed by the emulator during execution of the application, i.e., at "run time". While results from processing resources at run time can be stored and re-used in a form of cache, an application can use a large number of shaders and other graphics resources. Processing such resources at run time can consume significant processor and memory resources, affecting performance of the application.

SUMMARY

This Summary is provided to introduce a selection of concepts in a simplified form that are further described below in the Detailed Description. This Summary is intended neither to identify key or essential features, nor to limit the scope, of the claimed subject matter.

Resource processing during run time can be performed asynchronously from emulation of an application by a central processing unit. For example, an emulator can include a main processing thread that performs emulation processes. In response to encountering a shader, or other resource, to be processed, the emulator can invoke a separate asynchronous thread to perform such processing. Processed resources, such as translated shaders and generated textures, can be stored in a cache. In response to a command that uses a resource, such as a draw command that invokes a shader or other resource, the emulator can use the processed resource in the cache. If the processed resource is not in the cache, the emulator can skip processing the command that uses the resource. If processed resources can be obtained from other sources and loaded in the cache, processing of resources by the emulator can be eliminated.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

Figure 1:
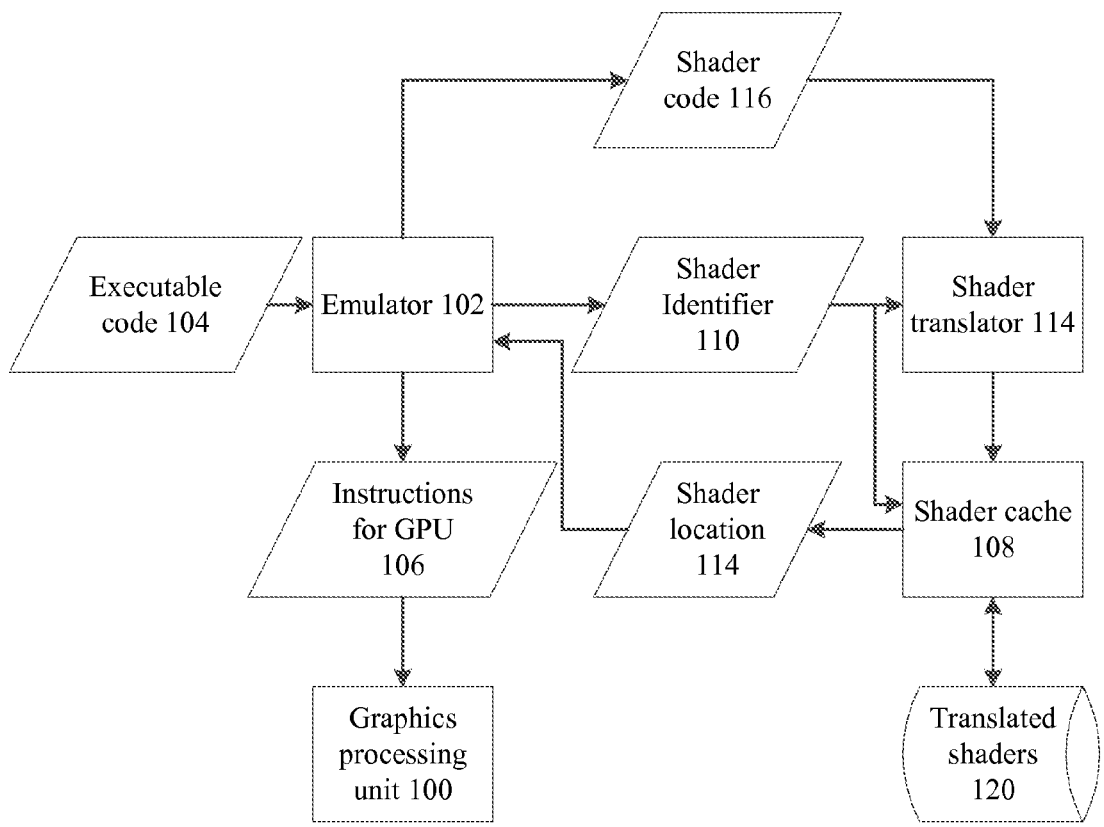
FIG. 1 is a block diagram of an example computer platform with an emulator and a graphics processing unit.

Referring to FIG. 1, an example implementation of a computer with an emulator and a graphics processing unit will now be described.

In FIG. 1, a computer (such as described generally in FIG. 10) includes a graphics processing unit 100. An emulator 102 is an application executed on the central processing unit (not shown) of the computer, which processes executable code 104 for a first type of graphics processing unit and outputs executable code 106 to a second type of graphics processing unit, i.e., the actual or target graphics processing unit 100 of this computer. An example of such an emulator is described in U.S. Patent Publication 2010/0214301, entitled "VGPU: A Real Time GPU Emulator", by Jinyu Li, et al., which is hereby incorporated by reference.

The executable code 104 processed by the emulator 102 can include one or more shaders, one or more graphics resources and/or yet other types of resources that the emulator processes at run time. For such resources, the computer includes a corresponding cache, such as a shader cache 108. Similar caches can be maintained for other types of resources. Given executable code 104 that includes a reference to a resource, such as a shader, an identifier 110 for the resource can be computed and used to access the cache.

For shaders, the identifier can be computed by applying a function, such as a hash function, to the executable code for the shader as input to the emulator, and other context information for the shader. The emulator 102 uses this identifier to access the shader cache 108, determining whether the executable code 112 for the GPU 100 for the shader is available in the shader cache 108.

If the executable code 112 for GPU 100 for the shader is not in the shader cache 108, then the emulator submits executable code 116 for the shader for translation to a shader translator 114. The shader translator 114 can be executed as an asynchronous thread that is separate from the main thread of the emulator 102. The shader translator processes executable code 116 from the emulator to generate executable code 112 for the GPU 100, and stores this executable code 112 as a translated shader in the shader cache 108.

In operation using a typical application running on a computer with a GPU 100, the emulator receives executable code 104 that typically first provides an instruction to load a shader to the GPU 100. After the shader is loaded, the executable code 104 then may include instructions to generate data, such as a draw command, using the loaded shader. Using the shader cache 108 and shader translator 114, the emulator can determine whether a shader is in the shader cache 108, and, if not, can instruct the shader translator 114 to translate the shader and load the translated shader into the cache. If the shader is in the shader cache, the emulator can submit an instruction to the GPU 100 to load the shader from the shader cache. Subsequently, if another instruction, such as a draw instruction, refers to that shader, and the shader is not in the cache, then that instruction can be skipped, as described in more detail below. Otherwise, if the shader is in the cache, then a draw instruction can be submitted to the GPU 100.

In some implementations, the shader cache can be loaded from a distribution of translated shaders 120 for an emulated application. In such an implementation, a shader translator can be omitted. Such a distribution can be part of a program of ongoing distribution of translated shaders for the emulated application.

An example implementation for the structure of the shader cache will now be described in more detail in connection with FIG. 2. The shader cache generally includes memory 200 for storing executable code for the GPU 100 for a plurality of shaders. An index 202 for this memory includes an entry 203 for each shader. An entry can include a shader identifier 204, a reference 206 to a location in memory 200 in which the executable code for the GPU 100 for this shader is stored. The reference 206 can be, for example, an address in memory or a special code indicating that the shader has not yet been translated or is otherwise unavailable in the memory 200. The shader identification can further include other information, such as an identifier 208 of the application that includes this shader as part of that application. An entry also can include an indicator 212 of whether the shader has been recently translated. For example, this indicator 212 can be set to a value, such as a bit or a date or text value, indicating whether the shader is new with respect to any installation of translated shaders.

As described in more detail below, an entry can be created in the index 202 in response to the emulator 102 determining that a shader is not in the cache 108 or in response to the emulator 102 submitting the shader to the shader translator 114 for translation. Upon creating the entry, the emulator can set the values in the entry to default values until the shader is translated and stored in the memory 200.

Having now described an example implementation of an emulator and a graphics processing unit, with an associated shader cache and shader translator, more details of an example implementation will now be described in connection with FIGS. 3 through 10.

Figure 3A:
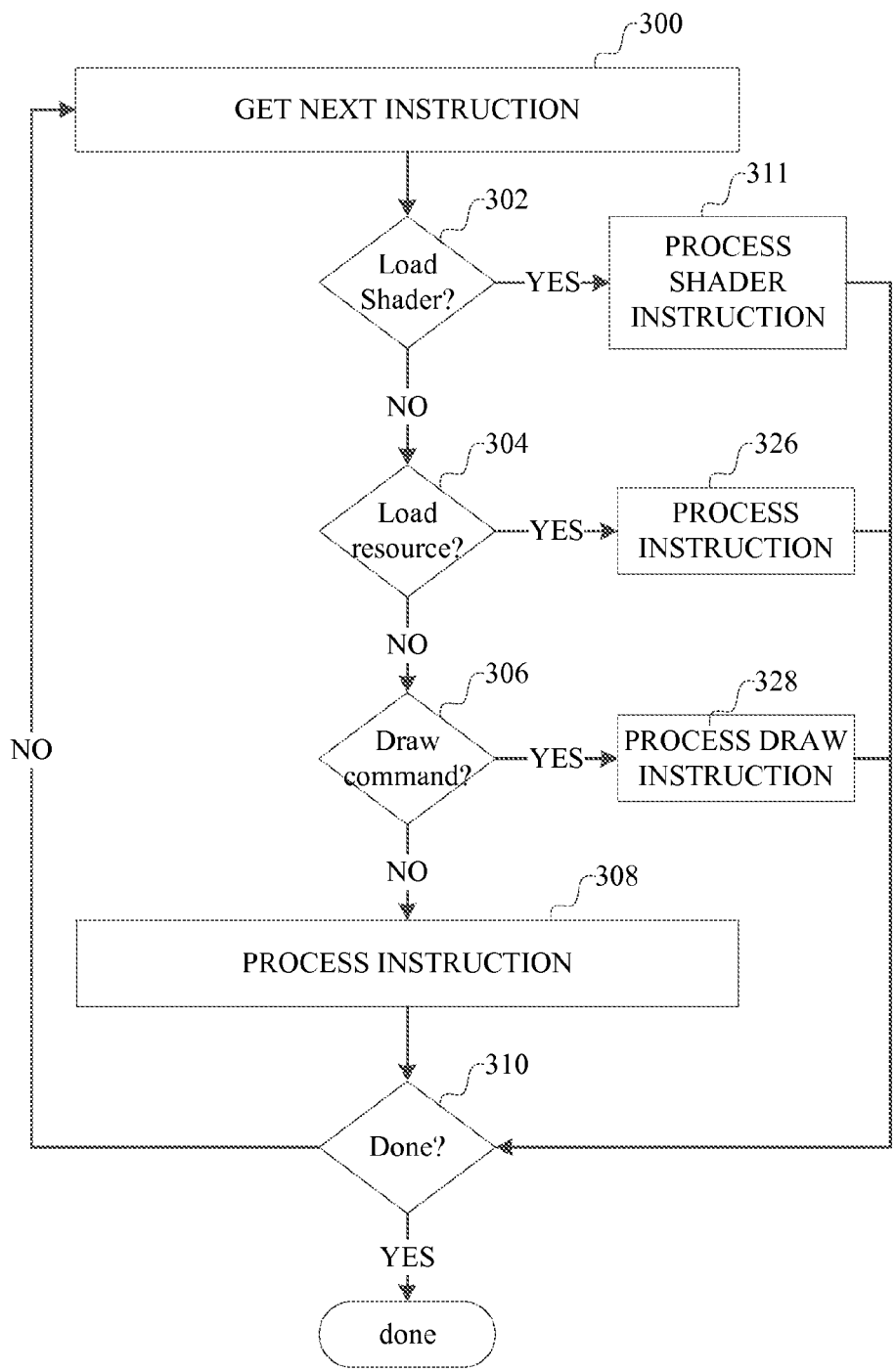
FIGS. 3A and 3B are a flow chart illustrating an example implementation of an emulator.
Figure 4:
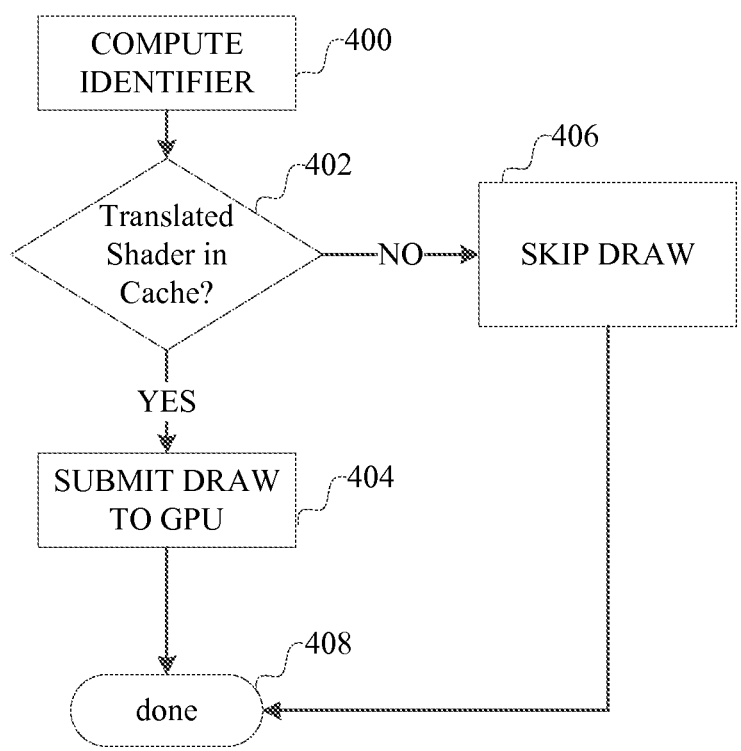
FIG. 4 is a flow chart illustrating an example implementation of processing a draw command.

FIG. 3A is a flowchart describing operation of an example implementation of a main thread of an emulator for processing instructions for a GPU. Generally, the emulator receives and processes a sequence of instructions. Thus, the process begins with receiving (300) an instruction for the GPU. The emulator determines (302) if the instruction is for loading a shader. If the instruction is not for loading a shader, the emulator determines (304) if the instruction is for computing and loading another kind of resource, such as a large texture. If the instruction is not for loading another kind of resource, then the emulator determines (306) if the instruction is a draw instruction that uses a cached resource, such as a shader. If the instruction is a draw instruction, then the instruction is processed 328 in a manner such as shown in FIG. 4. If the instruction is not a draw instruction, the instruction is otherwise processed (308).

It should be understood that the order of tests (302, 304, 306) is merely illustrative, as tests for any particular command can be performed by the emulator in any order. After completion of processing of an instruction, the emulator determines (310) if more instructions remain. If more instructions remain to be processed, then the emulator receives (300) the next instruction.

Figure 3B:
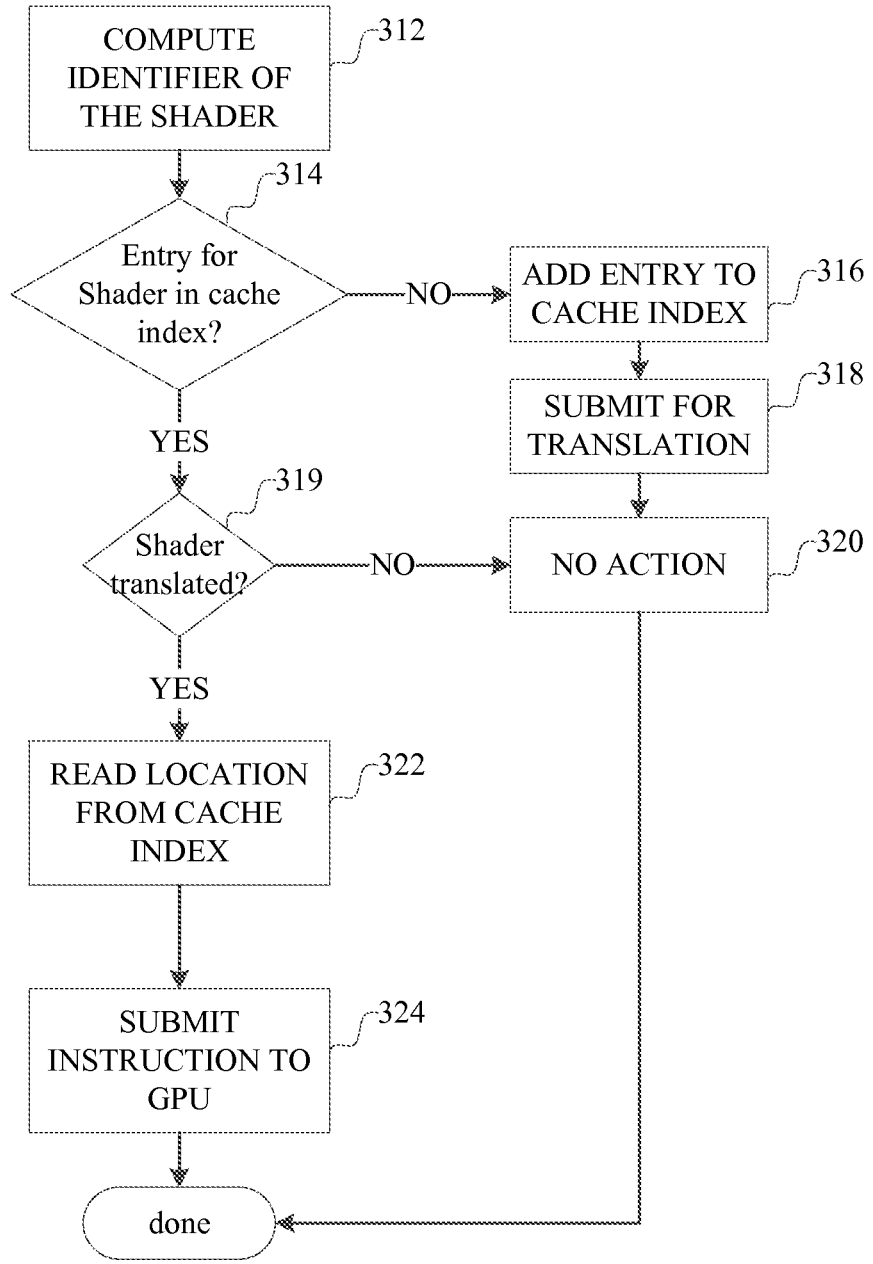

If the instruction is for loading a shader (as determined at 302), the shader instruction is processed 311 in the manner described in FIG. 3B. The emulator computes (312) an identifier for the shader. This computation can be a function, such as a hash function, of the executable code and the context from the load command. The emulator checks the shader cache for the identified shader. For example, if an entry for the shader is not in the cache, as determined at 314, then the emulator can add (316) an entry to the index with values indicating the shader is a newly found shader and has not been translated. The emulator submits (318) the shader for translation. If the entry is in the cache index, the emulator can determine (319) if the shader has been translated. If the shader has not yet been translated, then nothing else is done for this shader, as indicated at 320. If the entry is in the cache index and the shader has been translated, then the entry provides an address for the executable code for the shader. The emulator reads (322) the location for the shader from the shader cache index, and submits (324) a command to the GPU instructing the GPU to load the translated shader. After such an instruction is processed, processing of further instructions occurs through steps 310 and 300.

Similarly, if the instruction relates to loading another type of resource that may be cached, the emulator processes (326) the instruction in a similar way. For example, the emulator can check the cache, add the resource to the cache, instruct a processor to generate the resource, and use the cached resource. After such an instruction is processed, processing of further instructions occurs through steps 310 and 300.

Turning now to FIG. 4, an example implementation of how an emulator can handle a draw command or other similar command that uses a loaded shader or other resource will now be described.

In FIG. 4, the emulator computes 400 an identifier based on the draw command, which indicates a shader and some context information. The emulator determines 402 whether the shader with this identifier is in the cache. If the entry for the corresponding shader does not include an address for the translated shader, then the draw command is skipped 404, and processing of this draw command ends, as indicated at 408. Otherwise, if the translated shader is in the cache, then the emulator can submit 406 the draw instruction to the graphics processing unit. Similar processing can be implemented for other resources that may be cached and used by draw instructions. Similar processing can be implemented for other commands that use cached resources, if those commands are merely rendering commands for which any errors are primarily visual and transient.

Figure 5:
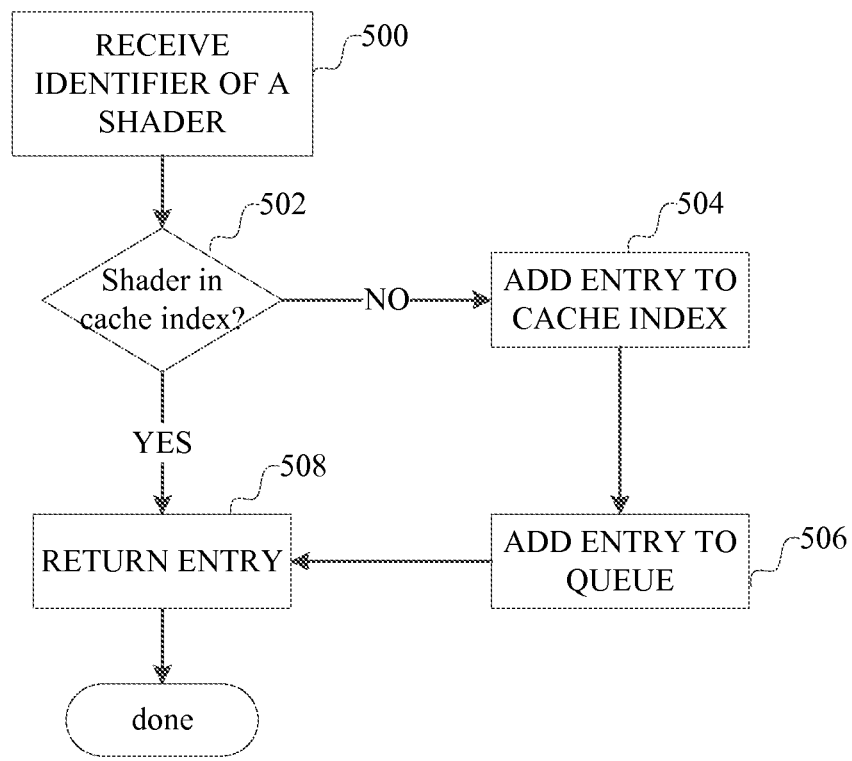
FIG. 5 is a flow chart illustrating an example implementation of an operation of a shader cache.
Figure 6:
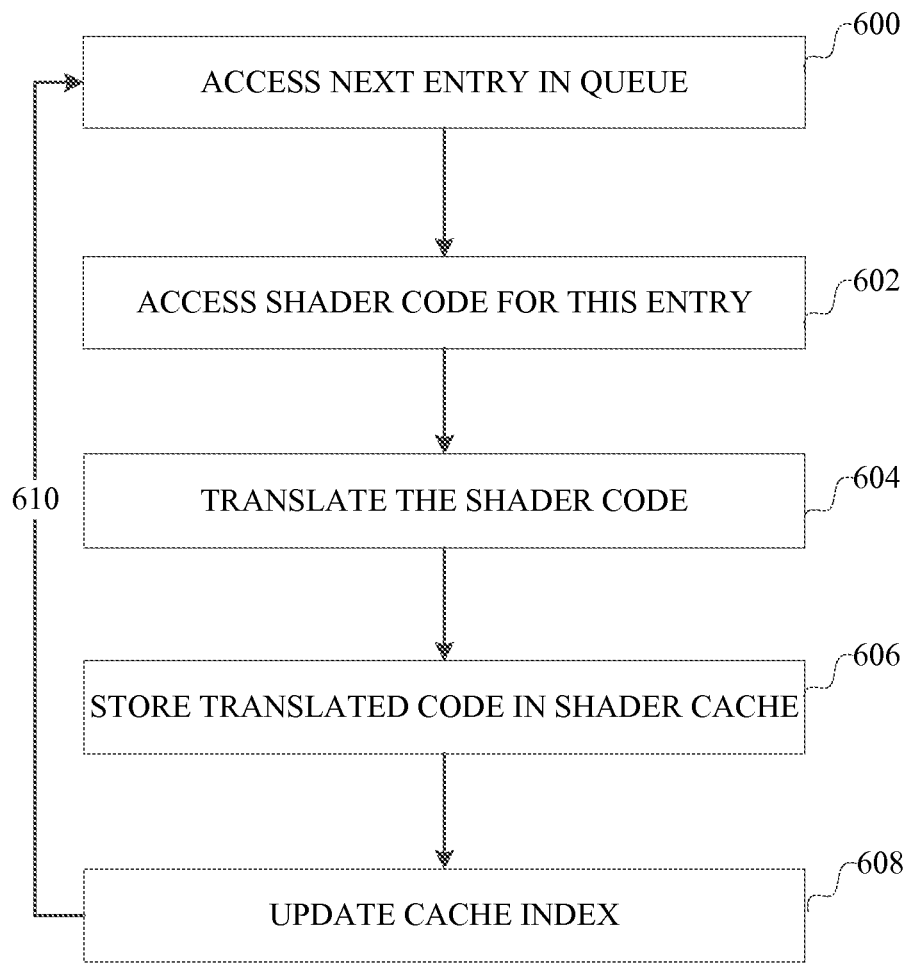
FIG. 6 is a flow chart illustrating an example implementation of an operation of a shader translator.
Figure 7:
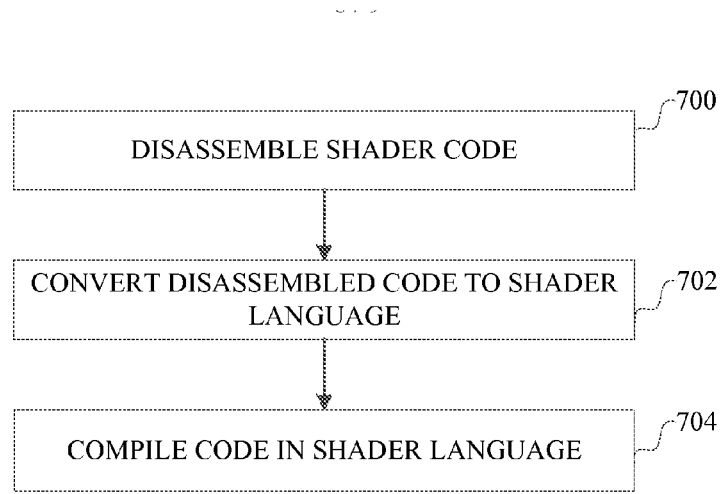
FIG. 7 is a flow chart illustrating an example implementation of an operation of a shader translator.

Referring now to FIG. 5, an example implementation of operation for a thread for managing a resource cache, such as a shader cache, will now be described. Portions of the steps shown in FIG. 3B (steps 314 through 318) can be implemented by such a shader cache thread, which in turn provides a value indicative of the location of the shader in the cache, if any.

In this example, the shader cache thread receives (500) an identifier of a shader and a reference to a location in memory that stores the shader code to be translated. If the identifier is not in the cache index, as determined at 502, the shader cache thread can add (504) an entry to the shader cache index for this shader. The shader cache thread also can add (506) an entry for this shader to a queue for translating this shader, and can invoke a translator. Translation can be done in a separate asynchronous thread in a manner described in more detail below in connection with FIGS. 6 and 7. If the translated shader is in the cache, or after an entry for the shader has been added to the cache index, the shader thread returns (508) contents of that entry from the cache index. As shown in FIG. 3B, a main thread of the emulator can determine, based on the location in the entry returned in step 508, whether the shader has been translated (see 319 in FIG. 3B).

To translate the shader, whether through 318 of FIG. 3B or 506 of FIG. 5, the emulator 102 can include a translator thread to asynchronously manage translation of the shader. Other resources requiring processing and which are stored in a cache can be processed in a similar manner. By providing the separate asynchronous thread, the emulator can continue processing instructions without waiting for translation to complete. The translator thread, in one implementation, uses a queue, which can be populated by a shader cache thread or the emulator main thread, to provide shaders to be translated. The translator thread accesses (600) a next entry in the queue. The shader code to be translated, corresponding to this entry in the queue, is then accessed (602). This shader code is translated (604). After translation, the translation thread stores (606) the translated code in a location in the memory for the shader cache, and updates (608) the shader cache index with that location. The translator thread can then continue with processing the next item in the queue, as indicated at 610.

The translation of a shader, and coordination of that translation with the emulator and shader cache, can be performed in several ways. In one example implementation, described in FIG. 7, includes several steps. First, the translator disassembles (700) the original executable shader code into an intermediate format, using standard code disassembly techniques. Another translator converts (702) the disassembled code into a shader language, such as HLSL. The output of step 702 generally can be any shader language for which there is a compiler that can output executable shader code for the GPU 100 of FIG. 1. Next, the original shader in the shader language is compiled (704). Steps 700 through 704 can be performed by the same computer that is running the emulator.

Alternatively, steps 700 and 704 can be performed by another computer to which the computer running the emulator transmits the shader for translation. In such an implementation, step 700 or 702 can be preceded with a step of transmission of the shader code to the other computer. Similarly, step 704 can be followed by a step of receiving the translated shader code from the other computer. In such a configuration, the other computer can receive, translate and aggregate translated shaders from multiple computers, from which distributions of translated shaders can be made. Such a system, as described in copending U.S. patent application entitled "Remote Translation, Aggregation and Distribution of Computer Program Resources in Graphics Processing Emulation", by Brian Spanton et al., filed on even date herewith, and hereby incorporated by reference, can be used in combination with a computer such as described herein.

Figure 8:
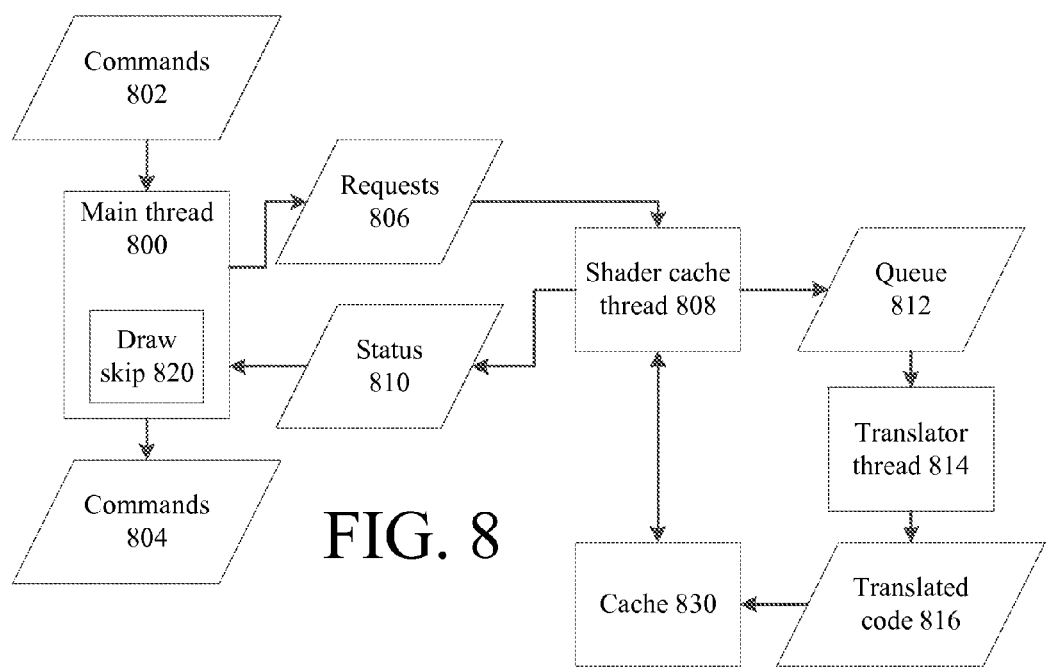
FIG. 8 is block diagram for an example implementation of an emulator.

FIG. 8 illustrates an example implementation for an architecture of the emulator as described in connection with FIGS. 3-7 above. In this example, the emulator includes a main thread 800 that processes commands 802 for an application and provides translated commands 804 to a graphics processing unit. This main thread 800 issues requests 806 to a shader cache thread 808. The main thread can be configured to access caches for other resources in a similar way. The main thread 800 also implements any command skipping functions as indicated at 820 for any resources not in a cache.

The shader cache thread manages a shader cache 830 by adding and updating entries of an index for the shader cache, based on code for translated shaders being stored in the shader cache. In response to requests from the main thread 800, the shader cache thread provides a current status 810 of a corresponding entry from the shader cache 830. The shader cache thread 808 also populates a queue 812 of items to be translated. A translator thread 814 accesses the queue 812 to identify shaders to be translated. This translator thread 814 can invoke a translation locally to the computer running the emulator, or can transmit a shader to another computer for translation. In another embodiment, the translated shaders also can be transmitted to another computer for storage and aggregation. The translator thread 814 updates the index of the shader cache 830 with the location in memory for the code for the translated shader 816.

By having a separate, asynchronous thread to translate shaders and update the cache, the main thread of an emulator can continue processing. If a draw command or other similar command is encountered during the emulation, rendering using this command can be skipped. Any error is merely visual and transient; however, the emulation of the application can continue without delay or impact on performance or response time to user interaction. After the translation has completed, the translated shader becomes available in the shader cache. In addition to shaders, such techniques can apply to other resources that may be generated at runtime by a graphics application.

Figure 9:
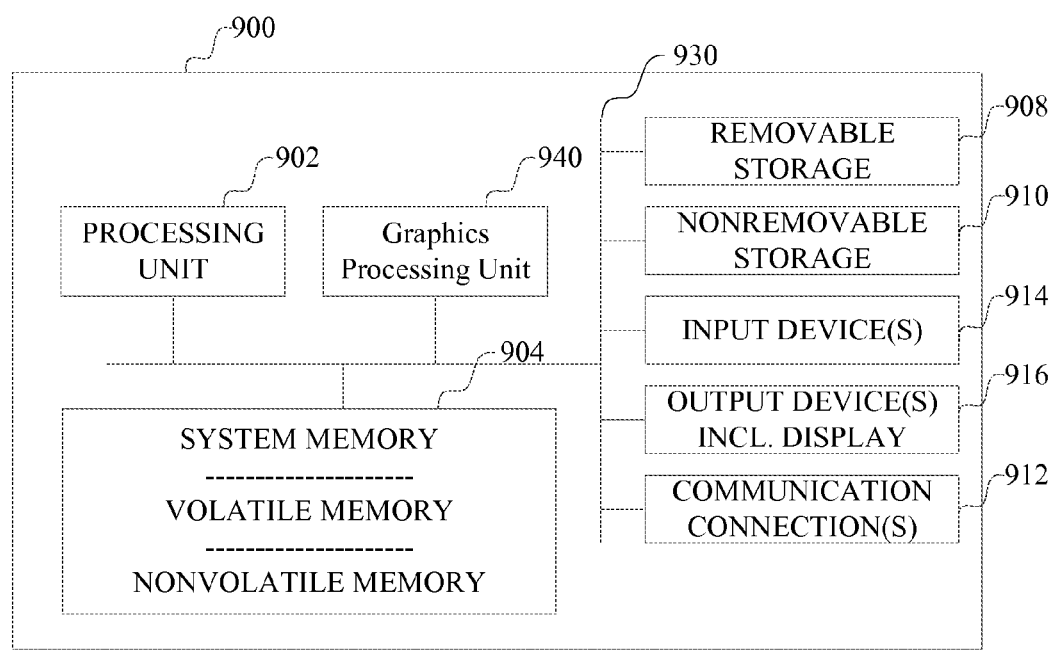
FIG. 9 is block diagram for an example implementation of a general purpose computing device.

Having now described an example implementation, FIG. 9 illustrates an example of a computer with which such techniques can be implemented to provide an emulator. This is only one example of a computer and is not intended to suggest any limitation as to the scope of use or functionality of such a computer.

The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones, personal data assistants, voice recorders), server computers, rack mounted computers, multiprocessor systems, microprocessor-based systems, programmable consumer electronics, networked personal computers, minicomputers, mainframe computers, and distributed computing environments that include any of the above types of computers or devices, and the like.

Referring now to FIG. 9, a computer generally incorporates a general purpose computer with computer programs providing instructions to be executed by one or more processors in the computer. Computer programs on a general purpose computer generally include an operating system and applications. The operating system is a computer program running on the computer that manages access to various resources of the computer by the applications and the operating system. The various resources generally include the one or more processors, storage (including memory and storage devices), communication interfaces, input devices and output devices. FIG. 9 illustrates an example of computer hardware of a computer in which an operating system, such as described herein, can be implemented using computer programs executed on this computer hardware. The computer hardware can include any of a variety of general purpose or special purpose computing hardware configurations of the type such as described in FIG. 9.

With reference to FIG. 9, an example computer 900 includes at least one processing unit 902 and memory 904. The computer can have multiple processing units 902 and multiple devices implementing the memory 904. A processing unit 902 can include one or more processing cores (not shown) that operate independently of each other. Additional co-processing units also can be present in the computer, including but not limited to one or more graphics processing units (GPU) 940, one or more digital signal processing units (DSPs) or programmable gate array (PGA) or other device that can be used as a coprocessor. The memory 904 may include volatile devices (such as dynamic random access memory (DRAM) or other random access memory device), and non-volatile devices (such as a read-only memory, flash memory, and the like) or some combination of the two. Other storage, such as dedicated memory or registers, also can be present in the one or more processors. The computer 900 can include additional storage, such as storage devices (whether removable or non-removable) including, but not limited to, magnetically-recorded or optically-recorded disks or tape. Such additional storage is illustrated in FIG. 9 by removable storage device 908 and non-removable storage device 910. The various components in FIG. 9 are generally interconnected by an interconnection mechanism, such as one or more buses 930.

A computer storage medium is any medium in which data can be stored in and retrieved from addressable physical storage locations by the computer. Computer storage media includes volatile and nonvolatile memory, and removable and non-removable storage devices. Memory 904, removable storage 908 and non-removable storage 910 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

Computer 900 may also include communications connection(s) 912 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals. Communications connections 912 are devices, such as a wired network interface, wireless network interface, radio frequency transceiver, e.g., Wi-Fi, cellular, long term evolution (LTE) or Bluetooth, etc., transceivers, navigation transceivers, e.g., global positioning system (GPS) or Global Navigation Satellite System (GLONASS), etc., transceivers, that interface with the communication media to transmit data over and receive data from communication media. One or more processes may be running on the processor and managed by the operating system to enable data communication over such connections.

The computer 900 may have various input device(s) 914 such as a keyboard, mouse or other pointer or touch-based input devices, stylus, camera, microphone, sensors, such as accelerometers, thermometers, light sensors and the like, and so on. The computer may have various output device(s) 916 such as a display, speakers, and so on. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various storage 910, communication connections 912, output devices 916 and input devices 914 can be integrated within a housing with the rest of the computer, or can be connected through various input/output interface devices on the computer, in which case the reference numbers 910, 912, 914 and 916 can indicate either the interface for connection to a device or the device itself as the case may be.

A computer generally includes an operating system, which is a computer program running on the computer that manages access to the various resources of the computer by applications. There may be multiple applications. The various resources include the memory, storage, input devices, output devices, and communication devices as shown in FIG. 9.

Figure 2:
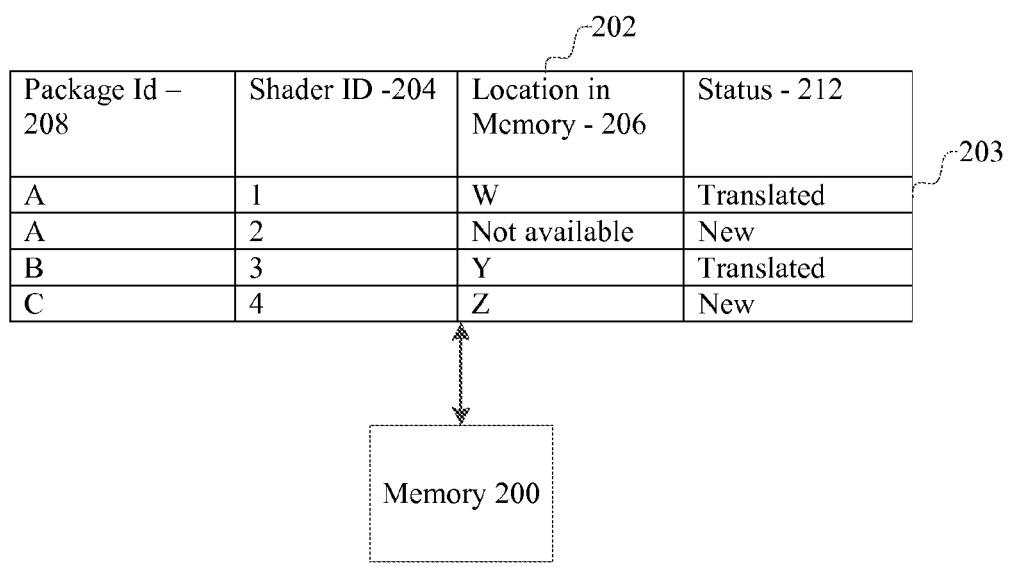
FIG. 2 is a diagram of an example implementation of a shader cache.

The various modules in FIGS. 1, 2 and 8, as well as any operating system, file system and applications on a computer in FIGS. 1 and 9, can be implemented using one or more processing units of one or more computers with one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct or configure the computer to perform operations on data or configure the computer to implement various components or data structures.

Accordingly, in one aspect, a computer is configured to emulate execution of a graphics application for a first graphics processing unit. The computer comprises a second graphics processing unit and storage. The computer further comprises one or more central processing units configured to execute an emulator application. The emulator application configures the computer to convert first commands for the first graphics processing unit, in response execution of the graphics application using the emulator application, to second commands that instruct the second graphics processing unit. The emulator application further configures the computer to manage a resource cache including translated resources for the second graphics processing unit for a plurality of resources. The emulation application further configures the computer, in response to a first command being a draw command using a resource and the translated resource for the second graphics processing unit for the resource not being in the resource cache, to skip rendering using the draw command.

In one aspect, a computer includes a means for emulating execution of a graphics application for a first graphics processing unit on the computer which comprises a second graphics processing unit, including means for managing a resource cache including translated resources for the second graphics processing unit for a plurality of resources, and means, operative in response to a first command being a draw command using a resource and the translated resource for the second graphics processing unit for the resource not being in the resource cache, for skipping rendering using the draw command.

In another aspect, a computer includes an emulator having a first thread configured to convert first commands for the first graphics processing unit to second commands that instruct the second graphics processing unit, and a second asynchronous thread, operative in response to the first thread detecting that a command in the first commands references a resource for which a translated resource is not in a resource cache, configured to translate the resource while the first thread is configured to skip the first command referencing the resource.

In another aspect, a computer-implemented process for emulating execution of a graphics application for a first graphics processing unit on a computer comprising a second graphics processing unit, comprises converting first commands for the first graphics processing unit, generated by execution of the graphics application by the emulator application, to second commands that instruct the second graphics processing unit. The process further comprises accessing a resource cache including translated resources for the second graphics processing unit for a plurality of resources. The process further comprises, in response to a first command being a draw command using a resource and the translated resource for the second graphics processing unit for the resource not being in the resource cache, skipping rendering using the draw command.

In another aspect, a computer program product, comprises storage configured to store computer program instructions of an emulator application, for emulating execution of a graphics application for a first graphics processing unit on a computer comprising a second graphics processing unit, storage, and one or more central processing units configured to execute the emulator application. The emulator application configures the computer to convert first commands for the first graphics processing unit, generated by execution of the graphics application by the emulator application, to second commands that instruct the second graphics processing unit, manage a resource cache including translated resources for the second graphics processing unit for a plurality of resources, and, in response to a first command being a draw command using a resource and the translated resource for the second graphics processing unit for the resource not being in the resource cache, skip rendering using the draw command.

In any of the foregoing aspects, the computer can be further configured by the emulator application to detect a first command providing an indication of a resource, to determine whether the translated resource for the second graphics processing unit for the resource is available in the resource cache and, in response to a determination that the translated resource for the second graphics processing unit for the resource is not in the resource cache, translate the resource indicated in the first command.

In any of the foregoing aspects, the computer can be further configured by the emulator application to detect a first command providing an indication of a shader, to determine whether the executable code for the second graphics processing unit for the shader is available in the shader cache and, in response to a determination that the executable code for the second graphics processing unit for the shader is not in the shader cache, translate the shader indicated in the first command.

In any of the foregoing aspects, the computer can be further configured by the emulator application to implement a first thread to convert first commands to second commands and at least one second thread, asynchronous to the first thread, to translate resources.

In any of the foregoing aspects, the computer can be further configured by the emulator application to, in response to a determination that the translated resource for the second graphics processing unit for the resource is not in the resource cache, add an entry in the cache index for the resource, the entry indicating that the translated resource for the second graphics processing unit for the resource is not in the memory.

In any of the foregoing aspects, the computer can be further configured by the emulator application to, in response to a determination that the translated resource for the second graphics processing unit for the resource is not in the resource cache, add an indication of the resource to a queue for translation.

In any of the foregoing aspects, the computer can be further configured by the emulator application to, in response to translation of the resource to provide the translated resource for the second graphics processing unit in the resource cache, update the entry in the cache index for the resource to provide an indication of the location in the memory of the translated resource for the second graphics processing unit for the resource.

In any of the foregoing aspects, the resource can comprise a resource generated through execution of the graphics application at runtime and the resource cache can comprise a cache of translated resources.

In any of the foregoing aspects, the resource can comprise a shader and the resource cache can comprise a shader cache.

In any of the foregoing aspects, the resource can comprise a texture and the resource cache can comprise a texture cache.

In any of the foregoing aspects, wherein the resource is a shader, the shader cache can comprise a memory configured to store executable code for the second graphics processing unit and a cache index configured to store, for each shader of the plurality of shaders, a location in the memory of the executable code for the shader.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

It should be understood that the subject matter defined in the appended claims is not necessarily limited to the specific implementations described above. The specific implementations described above are disclosed as examples only.

What is claimed is:

1. A computer configured to emulate execution of a graphics application for a first graphics processing unit, the computer comprising:
   a second graphics processing unit;
   storage;
   one or more central processing units configured to execute an emulator application, the emulator application configuring the computer to:
   convert first commands for the first graphics processing unit, generated by execution of the graphics application by the emulator application, to second commands that instruct the second graphics processing unit;
   manage a resource cache including translated resources for the second graphics processing unit for a plurality of resources; and
   in response to a first command being a draw command using a resource, and a determination that a translated resource for the second graphics processing unit corresponding to the resource used by the draw command is not in the resource cache, skip rendering a second command corresponding to the draw command and continue processing by the emulator application.

2. The computer of claim 1, wherein the resource comprises a shader and the resource cache comprises a shader cache.

3. The computer of claim 2, wherein the computer is further configured by the emulator application to:
   detect a first command providing an indication of a shader;
   determine whether the executable code for the second graphics processing unit for the shader is available in the shader cache;
   in response to a determination that the executable code for the second graphics processing unit for the shader is not in the shader cache, translate the shader indicated in the first command.

4. The computer of claim 3, wherein the emulator application, when executed by the computer, is configured to implement a first thread to convert first commands to second commands and at least one second thread, asynchronous to the first thread, to translate shaders.

5. The computer of claim 3, wherein the shader cache comprises a memory configured to store executable code for the second graphics processing unit and a cache index configured to store, for each shader of the plurality of shaders, a location in the memory of the executable code for the shader.

6. The computer of claim 5, wherein the computer is further configured by the emulator application to:
   in response to a determination that the executable code for the second graphics processing unit for the shader is not in the shader cache, add an entry in the cache index for the shader, the entry indicating that the executable code for the second graphics processing unit for the shader is not in the memory.

7. The computer of claim 6, wherein the computer is further configured by the emulator application to:
   in response to a determination that the executable code for the second graphics processing unit for the shader is not in the shader cache, add an indication of the shader to a queue for translation.

8. The computer of claim 7, wherein the computer is further configured by the emulator application to:
   in response to translation of the shader to provide the executable code for the second graphics processing unit for the shader, update the entry in the cache index for the shader to provide an indication of the location in the memory of the executable code for the second graphics processing unit for the shader.

9. A computer-implemented process for emulating execution of a graphics application for a first graphics processing unit on a computer comprising a second graphics processing unit, the computer-implemented process comprising:
   converting first commands for the first graphics processing unit, in response to execution of the graphics application using an emulator application, to second commands that instruct the second graphics processing unit;
   accessing a resource cache including translated resources for the second graphics processing unit for a plurality of resources; and
   in response to a first command being a draw command using a resource, and a determination that a translated resource for the second graphics processing unit corresponding to the resource used by the draw command is not in the resource cache, skipping rendering a second command corresponding to the draw command and continuing processing by the emulator application.

10. The computer-implemented process of claim 9, wherein the resource comprises a shader and the resource cache comprises a shader cache.

11. The computer-implemented process of claim 9, further comprising:
   detecting a first command providing an indication of a shader;
   determining whether the executable code for the second graphics processing unit for the shader is available in the shader cache; and
   in response to a determination that the executable code for the second graphics processing unit for the shader is not in the shader cache, translating the shader indicated in the first command.

12. The computer-implemented process of claim 11, wherein converting first commands to second commands is performed by a first thread executed on the computer and translating a shader is performed by a second thread, asynchronous to the first thread.

13. The computer-implemented process of claim 11, wherein the shader cache comprises a memory configured to store executable code for the second graphics processing unit and a cache index configured to store, for each shader of the plurality of shaders, a location in the memory of the executable code for the shader.

14. The computer-implemented process of claim 13, further comprising:
   in response to a determination that the executable code for the second graphics processing unit for the shader is not in the shader cache, adding an entry in the cache index for the shader, the entry indicating that the executable code for the second graphics processing unit for the shader is not in the memory.

15. The computer-implemented process of claim 14, further comprising:
   in response to a determination that the executable code for the second graphics processing unit for the shader is not in the shader cache, adding an indication of the shader to a queue for translation.

16. The computer-implemented process of claim 15, further comprising:
   in response to translation of the shader to provide the executable code for the second graphics processing unit for the shader is not in the shader cache, updating the entry in the cache index for the shader to provide an indication of the location in the memory of the executable code for the second graphics processing unit for the shader.

17. A computer program product, comprising:
   a computer storage medium configured to store computer program instructions of an emulator application, for emulating execution of a graphics application for a first graphics processing unit on a computer comprising a second graphics processing unit, storage, and one or more central processing units configured to execute the emulator application, the emulator application configuring the computer to:
   convert first commands for the first graphics processing unit, generated by execution of the graphics application by the emulator application, to second commands that instruct the second graphics processing unit;
   manage a resource cache including translated resources for the second graphics processing unit for a plurality of resources; and
   in response to a first command being a draw command using a resource, and a determination that a translated resource for the second graphics processing unit corresponding to the resource used by the draw command is not in the resource cache, skip rendering a second command corresponding to the draw command and continue processing by the emulator application.

18. The computer program product of claim 17 wherein the resource comprises a shader and the resource cache comprises a shader cache.

19. The computer program product of claim 18, wherein the emulator application further configures the computer to:
   detect a first command providing an indication of a shader;
   determine whether the executable code for the second graphics processing unit for the shader is available in the shader cache;
   in response to a determination that the executable code for the second graphics processing unit for the shader is not in the shader cache, translate the shader indicated in the first command.

20. The computer program product of claim 19, wherein the emulator application further configures the computer to implement a first thread to convert first commands to second commands and at least one second thread, asynchronous to the first thread, to translate shaders.

* * * * *